US006385441B1

(12) United States Patent
Takakusaki

(10) Patent No.: US 6,385,441 B1
(45) Date of Patent: May 7, 2002

(54) ARRAY ANTENNA RADIO COMMUNICATION APPARATUS

(75) Inventor: Keiji Takakusaki, Yokohama (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/295,522

(22) Filed: Apr. 21, 1999

(30) Foreign Application Priority Data

Apr. 28, 1998 (JP) .......................................... 10-119716

(51) Int. Cl.[7] ............................................... H04B 17/00

(52) U.S. Cl. .................... 455/226.1; 455/522; 455/67.1

(58) Field of Search ............................... 455/226.1, 25, 455/67.1, 562, 522, 69, 70, 67.6, 423, 424, 425, 296, 298, 295, 303, 272, 275, 276.1, 278.1; 375/347, 348, 346, 148, 144

(56) References Cited

U.S. PATENT DOCUMENTS 4,152,702 A * 5/1979 Piesinger .................... 342/367
4,554,546 A 11/1985 Herbreteau et al.
5,063,529 A 11/1991 Chapoton
5,412,414 A 5/1995 Ast et al.
5,546,090 A 8/1996 Roy, III et al.
5,710,981 A * 1/1998 Kim et al. .................... 455/69
5,809,063 A * 9/1998 Ashe et al. ................. 375/141
5,809,087 A * 9/1998 Ashe et al. ................. 375/340

FOREIGN PATENT DOCUMENTS

EP 0805510 11/1997

OTHER PUBLICATIONS

George V. Tsoulos & Mark A. Beach, Calibration and Linearity issues for an Adaptive Antenna System, IEEE, 0–7803–4075–2/97.

* cited by examiner

*Primary Examiner*—Nay Maung
*Assistant Examiner*—Erika A. Gary
(74) *Attorney, Agent, or Firm*—Greenblum & Bernstein, P.L.C.

(57) ABSTRACT

The array antenna radio communication apparatus of the present invention combines the outputs of calibration desired signal generator 101 and calibration interference signal generator 102 using combination section 104. When changing the power of the combined calibration signal, it fixes the power of calibration desired signal to avoid phase rotations due to the power control section and changes only the power of the calibration interference signal by power control section. The array antenna radio communication apparatus supplies this combined calibration signal to a plurality of radio circuits simultaneously or alternately and performs reception processing on only the calibration desired signal by received signal processing section 112 and measures reception characteristics.

16 Claims, 10 Drawing Sheets

ARRAY ANTENNA RADIO COMMUNICATION APPARATUS

BACKGROUND OF THE INVENTION

1. Field of the Invention

The present invention relates to array antenna radio communication apparatuses used in radio communication systems.

2. Description of the Related Art

An array antenna includes a plurality of antennas and is capable of freely setting reception directivity by adjusting the amplitude and phase of signals received from respective antennas. Adjustments to the amplitude and phase of a received signal can be carried out by multiplying the received signal by a complex coefficient in a received signal processing section.

FIG. 1 is a block diagram showing the configuration of a radio communication apparatus equipped with array antennas. FIG. 1 shows an example of communication apparatus with two antenna devices.

When communicating with another communication apparatus, this communication apparatus operates as follows. Radio signals are received through reception antennas 4 and 5. The received radio signals are supplied to reception radio circuits 8 and 9 via switching sections 6 and 7. As the switching sections here, various means can be used such as cable switching, mechanical switches and electronic switches. The received radio signals are down-converted to base frequency band or intermediate frequency band signals in reception radio circuits 8 and 9 and supplied to received signal processing section 10. Inside received signal processing section 10, demodulation processing is performed. The configuration of received signal processing section 10 is determined accordingly by the communication system used.

It is possible to selectively receive a certain electromagnetic wave coming from a desired direction with stronger power than other waves by adjusting a complex coefficient to be multiplied inside received signal processing section 10 above. This is called "bearing reception directivity." By bearing directivity it is possible to keep a reception SIR (Signal to Interference Ratio) high.

However, the characteristics of reception radio circuits 8 and 9 vary depending on the circuit because of variations in the characteristics of analog devices such as amplifiers. This adds to the received signal of each antenna unknown different amplitude variations and phase rotations, resulting in the formation of reception directivity different from the expected reception directivity obtained by multiplying a complex coefficient in received signal processing section 10.

In order to prevent such a phenomenon, adjustments need to be made so that the characteristics of reception radio circuits 8 and 9 may be identical. However, it is extremely difficult to adjust the characteristics of analog devices such as amplifiers accurately and in a time-invariable manner. Therefore, instead of adjusting the characteristics of reception radio circuits 8 and 9, a certain method is adopted by which the characteristics of reception radio circuits 8 and 9 are measured and stored in memory beforehand and a complex coefficient multiplied in received signal processing section 10 is determined by taking into account the fact that the amplitude and phase of the received signal change by the difference in their characteristics. Such an adjustment process is called "calibration."

Calibration is carried out before starting communications to measure the characteristics of the reception radio circuits. The following is an explanation of the calibration method.

A calibration signal is generated using calibration signal generator 1. Then, through power control section 2 such as an attenuator, the power of the calibration signal is controlled. The power-controlled calibration signal above is then distributed by distribution section 3, supplied to reception radio circuits 8 and 9 via switching sections 6 and 7. Here, distribution section 3 can be implemented using a distributor capable of supplying two-or more signals or switches that supply only one signal or cable switching.

The received signals of the reception radio circuits are observed by received signal processing section 10 and deviations from the expected amplitude and phase of the output signals of reception radio circuits 8 and 9 are stored in a calibration table as the characteristic differences to be corrected at the time of communications. Since the characteristic differences are measured for each reception radio circuit independently, calibration tables are also created independently by the number of reception radio circuits. The calibration tables are incorporated in recording section 11 provided inside or outside received signal processing section 10.

To observe differences in the reception characteristics due to the differences in the power of received signals, their amplitudes are changed by power control section 2 and the same processing is carried out. If distribution section 3 provides only one output at a time, processing is repeated by the number of antenna branches of this communication apparatus. If distribution section 3 supplies a plurality of outputs, calibrations corresponding to a plurality of antenna branches can be carried out simultaneously.

Through the processing above, reception calibrations for all antenna branches are completed. Then, the inputs of the reception radio circuits are switched by the switching sections to the reception antennas and communications are started. The received signal processing section carries out processing during communications with reference to the calibration tables so that the recorded characteristic differences of the reception radio circuits may be offset.

However, the conventional array antenna communication apparatus above has problems as shown below.

In order to observe the differences in the reception characteristics due to the differences in the power of received signals, their amplitudes must be changed by the power control section. However, in the power control section such as an attenuator and variable gain amplifier, controlling the amplitudes may affect signal propagation delay times, causing unexpected phase rotations to be added to the received signals. The phase characteristics of the reception radio circuits measured here result in a combination of phase rotations produced by the reception radio circuits themselves and those produced by the power control section, causing erroneous characteristics to be stored in the calibration tables. This will cause erroneous corrections to be made to the received signals during a communication, preventing correct formation of reception directivity.

SUMMARY OF THE INVENTION

It is an objective of the present invention to provide an array antenna radio communication apparatus capable of obtaining accurate reception directivity even if the power of a received signal varies.

This objective is achieved by an array antenna radio communication apparatus comprising two calibration signal generators; a calibration desired signal generator and calibration interference signal generator, which controls only the output of the calibration interference signal generator through a power control section and combines this power-controlled calibration interference signal and the calibration desired signal with fixed power into a combined calibration signal using a combination section.

When changing the power of the combined calibration signal in this apparatus, the power of the calibration desired signal is fixed by the power control section to avoid phase rotations and only the power of the calibration interference signal is changed by the power control section.

This combined calibration signal is supplied to a plurality of radio circuits simultaneously or alternately and reception processing is applied only to the desired signal in the received signal processing section and its reception characteristics are measured.

Through such a configuration and operation, the phase of the measured calibration desired received signal will no longer include phase rotations produced by the power control section. This makes it possible to measure the reception characteristics correctly when the power of the received signal varies, create accurate calibration tables and obtain accurate reception directivity using those calibration tables.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, the embodiments of the present invention are explained in detail below.

(Embodiment 1)

Figure 1:
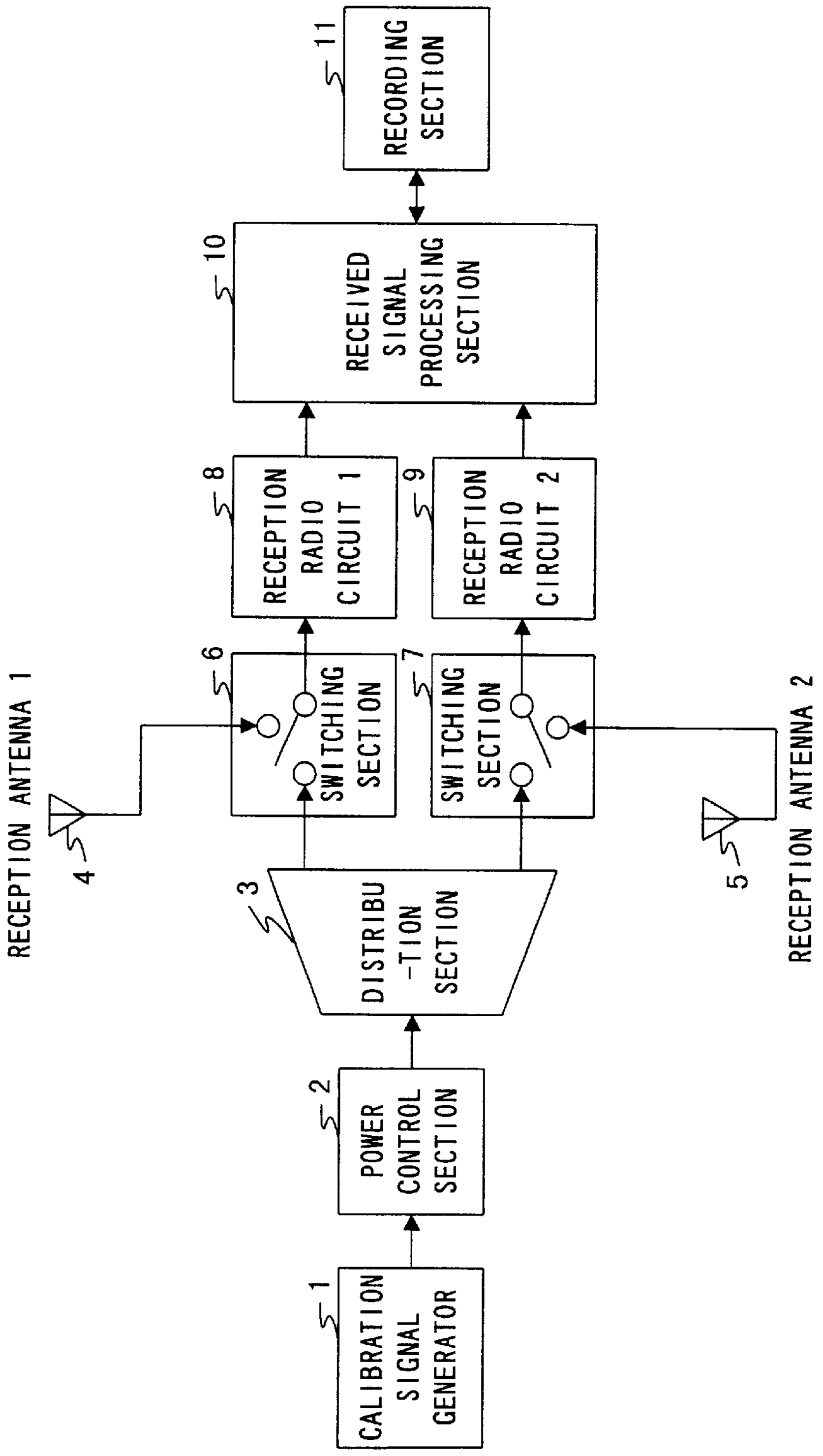
PRIOR ART FIG. 1
FIG. 1 is a block diagram showing the configuration of a conventional array antenna radio communication apparatus.
Figure 2:
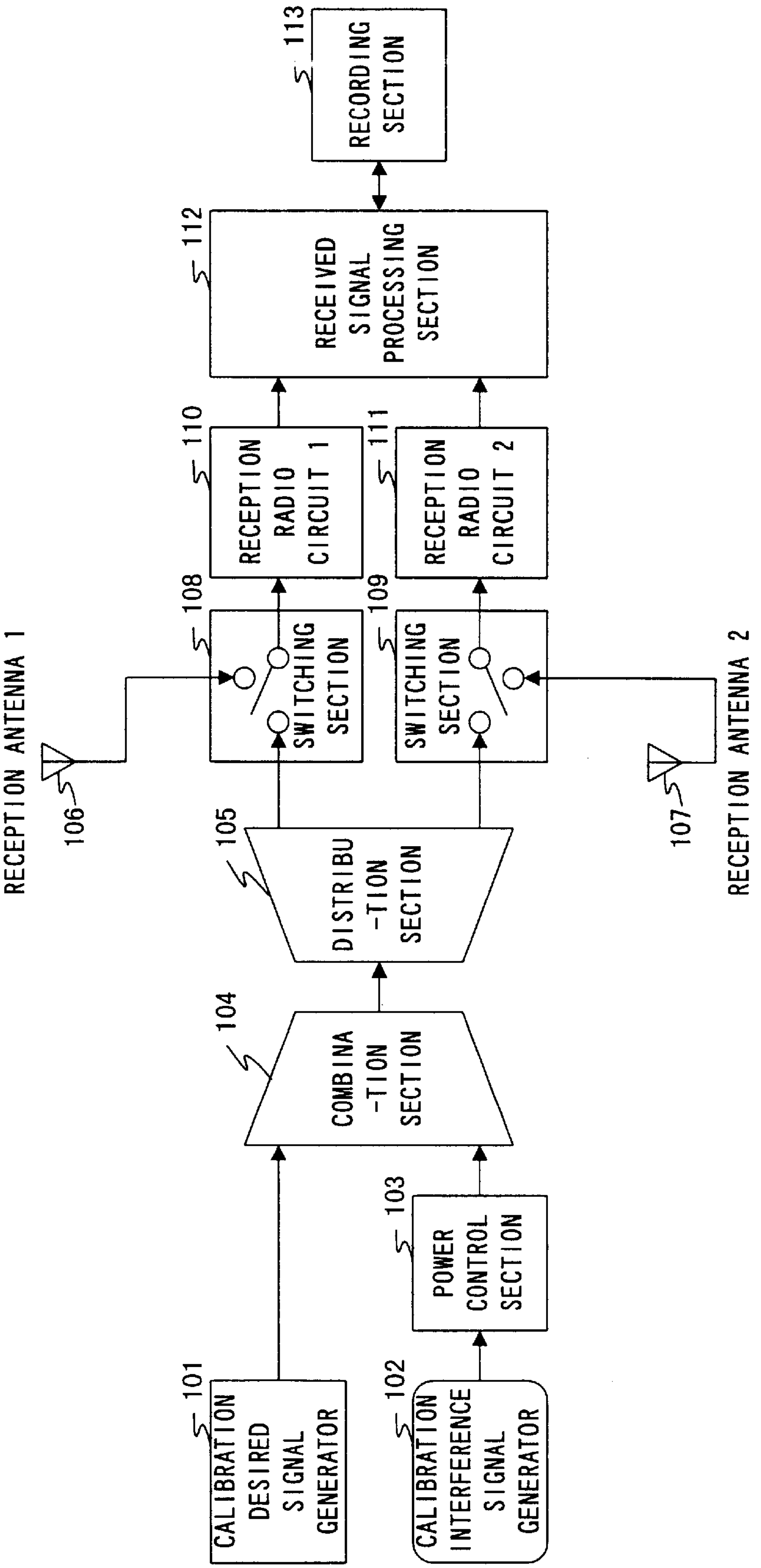
FIG. 2 is a block diagram showing the configuration of an array antenna radio communication apparatus according to Embodiment 1 of the present invention.

FIG. 2 is a block diagram showing the configuration of an array antenna radio communication apparatus according to Embodiment 1 of the present invention.

The array antenna radio communication apparatus according to the present embodiment comprises calibration desired signal generator 101 and calibration interference signal generator 102. As calibration interference signal generator 102, a section capable of generating random noise and non-modulated sine waves, etc. can be used. Power control section 103 adjusts the amplitude of an interference signal from calibration interference signal generator 102. Actually, an attenuator and variable gain amplifier, etc. may be used as the power control section.

Combination section 104 combines the calibration desired signal and calibration interference signal and distribution section 105 distributes the combined signal. As distribution section 105, if it is desired to supply two or more signals simultaneously a distributor may be used, and if it is desired to supply only one signal at a time either a switch or a cable switching section may be used.

Switching sections 108 and 109 switches between signal input from reception antennas 106 and 107 and calibration signal input. For example, cable switching, mechanical switches or electronic switches, etc. may be used. Reception radio circuits 110 and 111 demodulate the signals switched by switch sections 108 and 109. Received signal processing section 112 processes the signals using difference values stored in recording section 113.

Since the present embodiment takes as an example, an array antenna radio communication apparatus with an array antenna reception function using two antennas, there are two reception antennas, two switching sections and two reception radio circuits.

Figure 3:
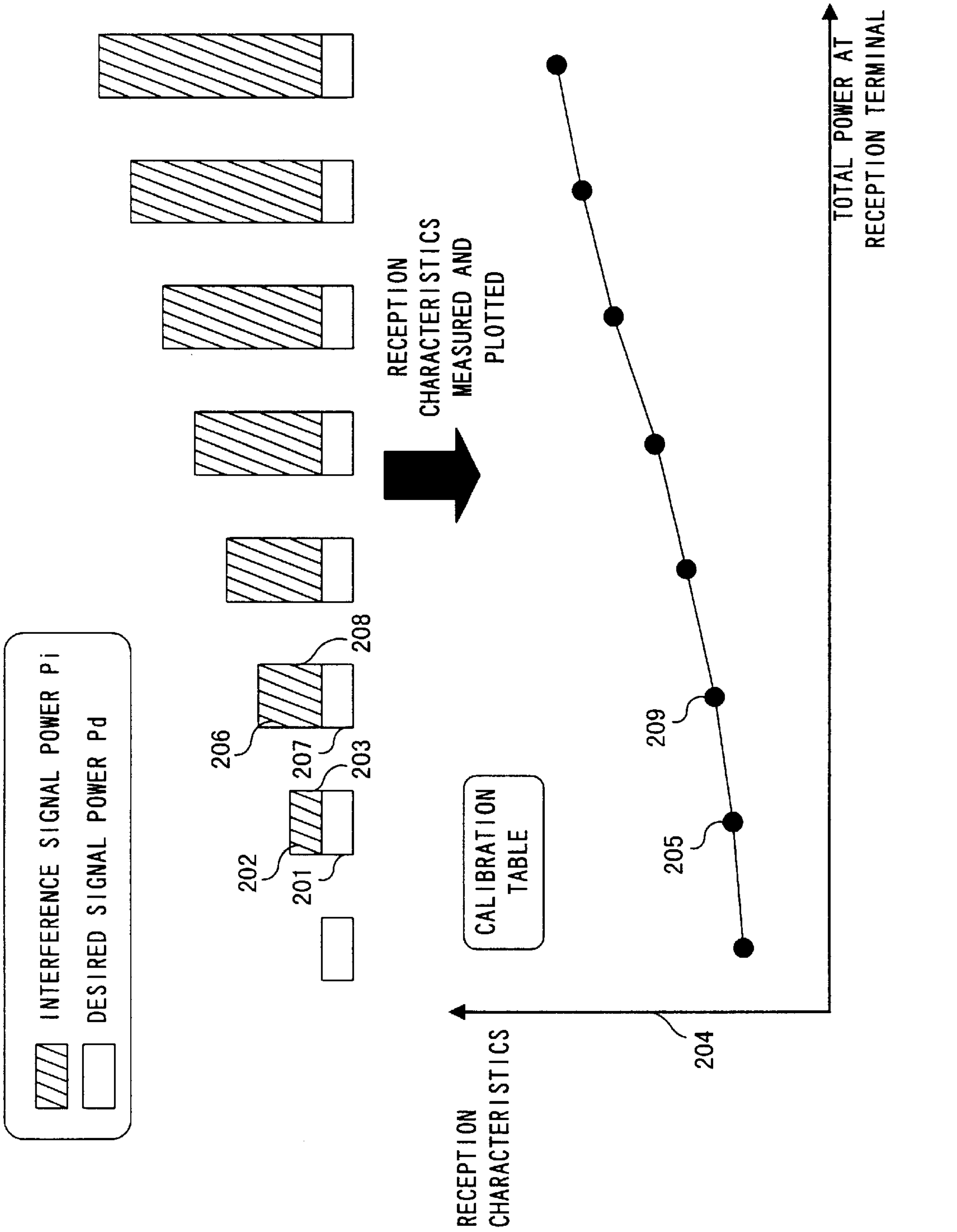
FIG. 3 is a schematic to explain the operation of the received signal processing section of the array antenna radio communication apparatuses according to Embodiments 1 to 3 of the present invention.

The operation of the array antenna radio communication apparatus according to Embodiment 1 of the present invention is explained using FIG. 2 and FIG. 3.

During a calibration, switching sections 108 and 109 are set so that the output of distribution section 105 may be supplied to reception radio circuits 110 and 111. First, reception characteristics corresponding to the power of a combined calibration signal at a certain level are measured.

Calibration desired signal generator 101 generates a calibration desired signal that can be demodulated by received signal processing 112.

Power generated Pd is fixed at a certain value. In FIG. 3, the value of Pd is illustrated by white bar graph 201.

Calibration interference signal generator 102 generates calibration interference signals such as random noise or non-modulated sine waves which can not always be demodulated by received signal processing section 112. The power of calibration interference signals is controlled by power control section 103. Here the signal power at the output of power control section 103 is assumed to be Pi. In FIG. 3, the value of Pi is illustrated by shaded bar graph 202.

A calibration desired signal with signal power Pd and calibration interference signal with signal power Pi are combined by combination section 104 into a combined calibration signal, which in turn is supplied to reception radio circuits 110 and 111 via switching sections 108 and 109. The power of the combined calibration signal is Pd+Pi at this time. In FIG. 3, the value Pd+Pi is represented by sum 203 of white bar graph 201 and shaded bar graph 202.

Received signal processing section 112 obtains a demodulated signal by demodulating the outputs of reception radio circuits 110 and 111. Furthermore, received signal processing section 112 operates so that only the calibration desired signal component may be demodulated. At this time, as stated above, the calibration interference signal is not the one that can not necessarily be demodulated by received signal processing section 112, and thus the calibration interference signal component is superimposed on the demodulated signal as noise.

Then, received signal processing section 112 observes the demodulated signal obtained in this way and obtains the reception characteristics. The reception characteristics include, for example, the phase and amplitude of the demodulated signal. Received signal processing section 112 records the deviation from the expected value in the reception characteristics in a calibration table as a characteristic difference to be corrected at the time of communication.

When illustrated in a logical image drawing, this would be equivalent to placing plot 205 in calibration table 204 in which calibration signal power Pi+Pd is plotted on the horizontal axis and the characteristic difference is plotted on the vertical axis. Since measurements of the characteristic difference are performed independently for each reception radio circuit, calibration tables are also created independently by the number of reception radio circuits. Calibration tables are stored in recording section 113 provided inside or outside the received signal processing section.

This completes a measurement of the reception characteristics for the power of one combined calibration signal.

Then, another measurement of the reception characteristics is carried out for the power of another combined calibration signal. Using power control section 103, only calibration interference signal power Pi is set to a value expressed by bar graph 206. At this time, since calibration desired signal power Pd is not changed, Pd is expressed by white bar graph 207 as high as white bar graph 201. At this time, the combined calibration signal power is Pd+Pi the same as above. In FIG. 3, value Pd+Pi is illustrated by sum 208 of white bar graph 207 and shaded bar graph 206.

Likewise, received signal processing section 112 records the deviation from the expected value in the reception characteristics in a calibration table as a characteristic difference to be corrected at the time of communication. When illustrated in a logical image drawing, this would be equivalent to placing plot 209 in calibration table 204.

Thus, in this calibration method, calibrations are carried out by keeping the calibration desired signal power constant, while increasing the calibration interference signal power. That is, the power of the calibration interference signal is controlled in order to change the total power when creating a calibration table. This means that the difference in the power control section itself is included in (added to) the calibration interference signal. On the other hand, since the calibration interference signal is simply treated as noise by received signal processing section 112, only the difference of the reception radio circuits can be detected by received signal processing section 112. Therefore, it is possible to create an accurate calibration table that reflects only the difference of the reception radio circuits.

By repeating the above processing, the reception characteristics are measured for all required power of combined calibration signals and data are recorded in calibration tables. This completes the calibration processing.

By the way, if one communication is not immediately followed by another, for example, when only a measurement of the reception radio circuit characteristics is intended, a method of observing the reception characteristics directly from the received signal processing section can be adopted without the need to provide recording section 113 in the apparatus.

If one communication is immediately followed by another, the following processing is performed. First, switching sections 108 and 109 are set in such a way that the outputs of reception antennas 106 and 107 are supplied to reception radio circuits 110 and 111. Received signal processing section 112 carries out such processing that the measured reception characteristics are offset by referencing the calibration tables created by the calibration processing.

With such a configuration and operation, the phase of the measured calibration desired signal does not include phase rotations (differences) generated by the power control section. This makes it possible to carry out accurate measurements of the reception characteristics when the received signal power varies, create accurate calibration tables and obtain accurate reception directivity using those calibration tables.

(Embodiment 2)

Figure 4:
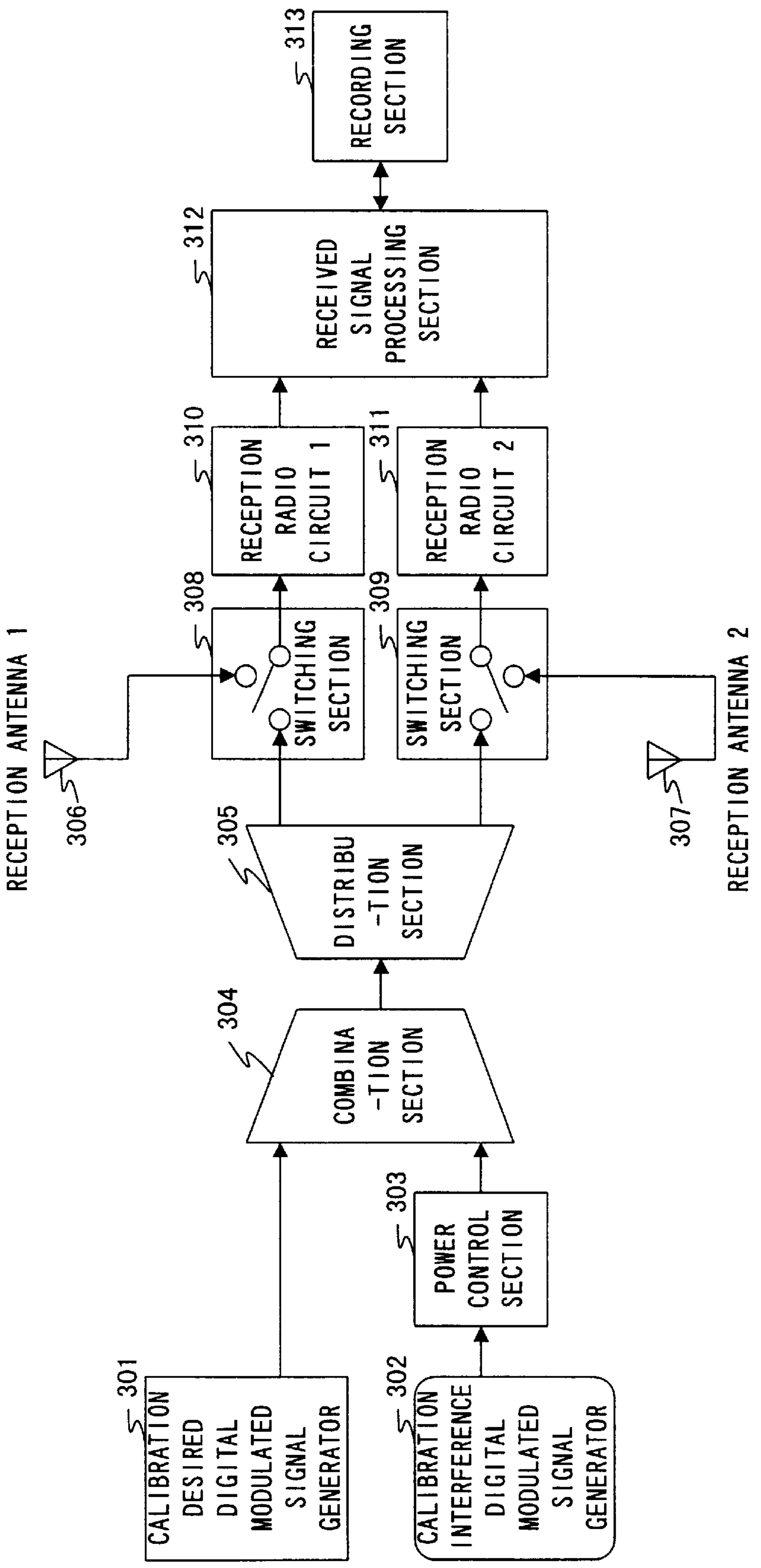
FIG. 4 is a block diagram showing the configuration of an array antenna communication apparatus according to Embodiment 2 of the present invention.

FIG. 4 is a block diagram showing the configuration of an array antenna radio communication apparatus according to Embodiment 2 of the present invention.

The antenna radio communication apparatus according to the present embodiment comprises calibration desired digital modulated signal generator 301 and calibration interference digital modulated signal generator 302. Both generators have the same configuration. Power control section 303 adjusts the amplitude of a modulated signal from calibration interference digital modulated signal generator 302. Actually, an attenuator and variable gain amplifier, etc. may be used as the power control section.

Combination section 304 combines the calibration desired digital modulated signal and calibration interference digital modulated signal and distribution section 305 distributes the combined signal. As distribution section 305, if it is desired to supply two or more signals simultaneously a distributor may be used, and if it is desired to supply only one signal at a time either a switch or a cable switching section may be used.

Switching sections 308 and 309 receive signals from reception antennas 306 and 307, respectively. For switching sections 308 and 309, cable switching sections, mechanical switches and electronic switches, etc. may be used. Reception radio circuits 310 and 311 demodulate the signals switched by switch sections 308 and 309. Received signal processing section 312 processes the signals using difference values stored in recording section 313.

Since the present embodiment takes as an example, an array antenna radio communication apparatus with an array antenna reception function using two antennas, there are two reception antennas, two switching sections and two reception radio circuits.

The operation of the array antenna radio communication apparatus according to Embodiment 2 of the present invention is explained using FIG. 3 and FIG. 4.

During a calibration, switching sections 308 and 309 are set so that the output of distribution section 305 may be supplied to reception radio circuits 310 and 311. First, reception characteristics corresponding to the power of a combined calibration signal at a certain level are measured.

Calibration desired digital modulated signal generator 301 generates a calibration desired digital modulated signal that can be demodulated by received signal processing 312. The totality or part of the modulation digital information of the calibration desired digital modulated signal must be known to received signal processing section 312. Power generated Pd is fixed at a certain value. In FIG. 3, the value of Pd is illustrated by white bar graph 201.

Calibration interference digital modulated signal generator 302 has the same configuration as that of calibration desired digital modulated signal generator 301 and generates calibration interference digital modulated signals different from calibration desired digital modulated signals. The power of calibration interference digital modulated signals is controlled by power control section 303. Here the signal power at the output of power control section 303 is assumed to be Pi. In FIG. 3, the value of Pi is illustrated by shaded bar graph 202.

A calibration desired digital modulated signal with signal power Pd and calibration interference digital modulated signal with signal power Pi are combined by combination section 304 into a combined calibration digital modulated signal, which in turn is supplied to reception radio circuits 310 and 311 via switching sections 308 and 309. The power of the combined calibration signal at this time is Pd+Pi. In FIG. 3, the value Pd+Pi is represented by sum 203 of white bar graph 201 and shaded bar graph 202.

Received signal processing section 312 obtains a demodulated signal by demodulating the outputs of reception radio circuits 310 and 311. Here, only the calibration desired digital modulated signal component needs to be demodulated, but it has the calibration interference digital modulated signal component superimposed on it and it is usually impossible to demodulate it. Therefore, the demodulated signal of the combined calibration digital modulated signal is multiplied by a known modulation digital information series of the calibration interference digital modulated signal and the result is integrated. This makes the calibration interference digital modulated signal component averaged and suppressed, making it possible to extract only the calibration desired digital modulated signal component.

Then, received signal processing section 312 observes the demodulated signal obtained in this way and obtains the reception characteristics. The reception characteristics include, for example, the phase and amplitude of the demodulated signal. Received signal processing section 312 records the deviation from the expected value in the reception characteristics in a calibration table as a characteristic difference to be corrected at the time of communication. The calibration tables are the same as those in Embodiment 1. The calibration tables are stored in recording section 313 provided inside or outside the received signal processing section.

This completes a measurement of the reception characteristics for the power of one combined calibration signal.

Then, another measurement of the reception characteristics is carried out for the power of another combined calibration signal. Using power control section 303, only calibration digital modulated interference signal power Pi is changed and set to a value expressed by shaded bar graph 206. At this time, since calibration digital modulated desired signal power Pd is not changed, Pd is expressed by white bar graph 207 as high as white bar graph 201. At this time, the combined calibration digital modulated signal power is Pd+Pi the same as above. In FIG. 3, value Pd+Pi is illustrated by sum 208 of white bar graph 207 and shaded bar graph 206.

Likewise, received signal processing section 312 records the deviation from the expected value in the reception characteristics in a calibration table as a characteristic difference to be corrected at the time of communication. When illustrated in a logical image drawing, this would be equivalent to placing plot 209 in calibration table 204.

Thus, in this calibration method, calibrations are carried out by keeping the calibration desired digital modulated signal power constant, while increasing the calibration interference digital modulated signal power. That is, the power of the calibration interference digital modulated signal is controlled in order to change the total power when creating a calibration table. This means that the difference in the power control section itself is only included in the calibration interference digital modulated signal. On the other hand, received signal processing section 312 averages and suppresses the calibration interference digital modulated signal by multiplying the demodulated signal by a modulated digital information series and integrating it. This allows received signal processing section 312 to extract only the calibration desired digital modulated signal component, making it possible to detect the difference only from the reception radio circuits. Therefore, it is possible to create an accurate calibration table that reflects only the difference of the reception radio circuits.

By repeating the above processing, the reception characteristics are measured for all required power of combined calibration signals and data are recorded in calibration tables. This completes the calibration processing.

By the way, if one communication is not immediately followed by another, for example, when only a measurement of the reception radio circuit characteristics is intended, a method of observing the reception characteristics directly from the received signal processing section can be adopted without the need to provide recording section 313 in the apparatus.

If one communication is immediately followed by another, the following processing is performed. First, switching sections 308 and 309 are set in such a way that the outputs of reception antennas 306 and 307 are supplied to reception radio circuits 310 and 311. Received signal processing section 312 carries out such processing that the measured reception characteristics are offset by referencing the calibration tables created by the calibration processing.

With such a configuration and operation, the phase of the measured calibration desired digital modulated signal does not include phase rotations generated by the power control section. This makes it possible to carry out accurate measurements of the reception characteristics when the received signal power varies, create accurate calibration tables and obtain accurate reception directivity using those calibration tables.

In addition, since the calibration interference digital modulated signal generator can have the same configuration as that of the calibration desired digital modulated signal generator, it has an advantage that the transmission section inside the communication apparatus can be diverted as the calibration interference digital modulated signal generator eliminating the necessity of providing a dedicated calibration signal generator which can generate random noise.

(Embodiment 3)

Figure 5:
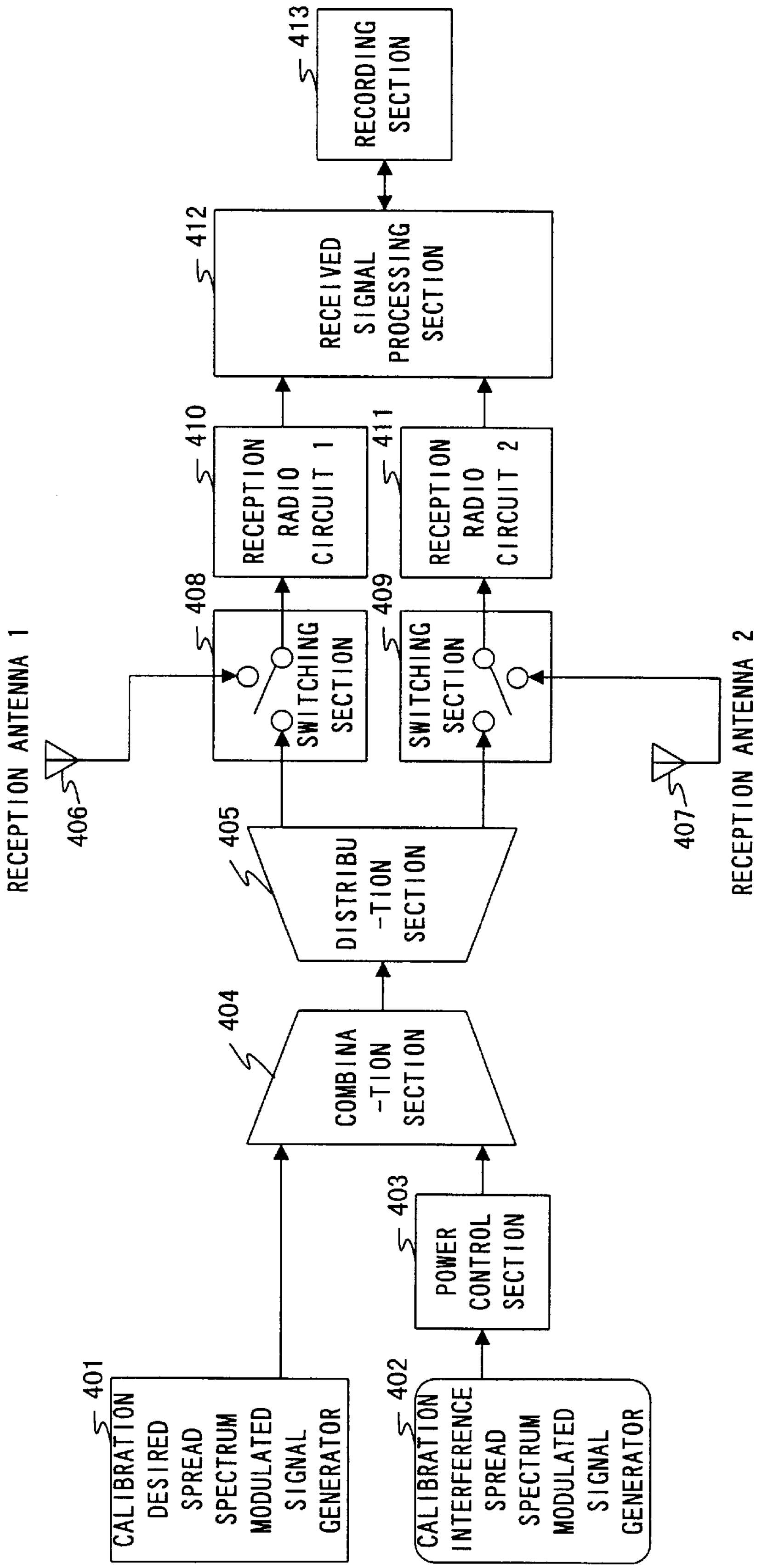
FIG. 5 is a block diagram showing the configuration of an array antenna communication apparatus according to Embodiment 3 of the present invention.

FIG. 5 is a block diagram showing the configuration of an array antenna radio communication apparatus according to Embodiment 3 of the present invention.

The antenna radio communication apparatus according to the present embodiment comprises calibration desired spread spectrum modulated signal generator 401 and calibration interference spread spectrum modulated signal generator 402. Both generators have the same configuration and carry out spread spectrum modulation using mutually different spreading codes. Power control section 403 adjusts the amplitude of a modulated signal from calibration interference spread spectrum modulated signal generator 402. It is possible to use an attenuator and variable gain amplifier as the actual power control section.

Combination section 404 combines the calibration desired spread spectrum modulated signal and calibration interference spread spectrum modulated signal and distribution section 405 distributes the combined signal. As distribution section 405, if it is desired to supply two or more signals simultaneously a distributor may be used, and if it is desired to supply only one signal at a time either a switch or a cable switching section may be used.

Switching sections 408 and 409 receive signals from reception antennas 406 and 407, respectively. For switching sections 308 and 309, cable switching sections, mechanical switches and electronic switches, etc. may be used. Reception radio circuits 410 and 411 demodulate the signals switched by switch sections 408 and 409. Received signal processing section 412 processes the signals using difference values stored in recording section 413. 410 and 411 are reception radio circuits.

Since the present embodiment takes as an example, an array antenna radio communication apparatus with an array antenna reception function using two antennas, there are two reception antennas, two switching sections and two reception radio circuits.

The operation of the array antenna radio communication apparatus according to Embodiment 3 of the present invention is explained using FIG. 3 and FIG. 5.

During a calibration, switching sections 408 and 409 are set so that the output of distribution section 405 may be supplied to reception radio circuits 410 and 411. First, reception characteristics corresponding to the power of a combined calibration spread spectrum modulated signal at a certain level are measured.

Calibration desired spread spectrum modulated signal generator 401 generates a calibration desired spread spectrum modulated signal that can be demodulated by received signal processing 412. The spreading codes of the calibration desired spread spectrum modulated signal must be known to received signal processing 412. Power generated Pd is fixed at a certain value. In FIG. 3, the value of Pd is illustrated by white bar graph 401.

Calibration interference spread spectrum modulated signal generator 402 has the same configuration as that of calibration desired spread spectrum modulated signal generator 401 and generates calibration interference spread spectrum modulated signals whose spreading code is different from that of calibration desired spread spectrum modulated signals. The power of calibration interference spread spectrum modulated signals is controlled by power control section 403. Here the signal power at the output of power control section 403 is assumed to be Pi. In FIG. 3, the value of Pi is illustrated by shaded bar graph 202.

A calibration desired spread spectrum modulated signal with signal power Pd and calibration interference spread spectrum modulated signal with signal power Pi are combined by combination section 404 into a combined calibration spread spectrum modulated signal, which in turn is supplied to reception radio circuits 410 and 411 via switching sections 408 and 409. The power of the combined calibration spread spectrum modulated signal at this time is Pd+Pi. In FIG. 3, the value Pd+Pi is represented by sum 203 of white bar graph 201 and shaded bar graph 202.

Received signal processing section 412 obtains a demodulated signal by demodulating the outputs of reception radio circuits 410 and 411. Here, only the calibration desired spread spectrum modulated signal component needs to be demodulated, but since the spreading code of the calibration desired spread spectrum modulated is known to received signal processing section 412, it is possible to extract the calibration desired spread spectrum modulated signal component by finding correlation with this spreading code and combined calibration spread spectrum modulated signal.

Then, received signal processing section 412 observes the demodulated signal obtained in this way and obtains the reception characteristics. The reception characteristics include, for example, the phase and amplitude of the demodulated signal. Received signal processing section 412 records the deviation from the expected value in the reception characteristics in a calibration table as a characteristic difference to be corrected at the time of communication. The calibration tables are the same as those in Embodiment 1. The calibration tables are stored in recording section 413 provided inside or outside the received signal processing section.

This completes a measurement of the reception characteristics for the power of one combined calibration spread spectrum modulated signal.

Then, another measurement of the reception characteristics is carried out for the power of another combined calibration spread spectrum modulated signal. Using power control section 403, only calibration interference signal power Pi is set to a value expressed by shaded bar graph 206. At this time, since calibration desired spread spectrum modulated signal power Pd is not changed, Pd is expressed by white bar graph 207 as high as white bar graph 201. At this time, the combined calibration signal power is Pd+Pi. In FIG. 3, value Pd+Pi is illustrated by sum 208 of white bar graph 207 and shaded bar graph 206.

Likewise, received signal processing section 412 records the deviation from the expected value in the reception characteristics in a calibration table as a characteristic difference to be corrected at the time of communication. When illustrated in a logical image drawing, this would be equivalent to placing plot 209 in calibration table 204.

Thus, in this calibration method, calibrations are carried out by keeping the power of the calibration desired spread spectrum modulated signal constant, while increasing the calibration interference spread spectrum modulated signal power. That is, the power of the calibration interference spread spectrum modulated signal is controlled in order to change the total power when creating a calibration table. This means that the difference in the power control section itself is only included in the calibration interference spread spectrum modulated signal. On the other hand, received signal processing section 412 can extract only the calibration desired spread spectrum modulated signal component by finding correlation between the spreading code and the combined calibration spread spectrum modulated signal, making it possible to detect only the difference of the reception radio circuits. Thus, it is possible to create an accurate calibration table which reflects the difference of only the reception radio circuits.

By repeating the above processing, the reception characteristics are measured for all required power of combined calibration spread spectrum modulated signals and data are recorded in calibration tables. This completes the calibration processing.

By the way, if one communication is not immediately followed by another, for example, when only a measurement of the reception radio circuit characteristics is intended, a method of observing the reception characteristics directly from the received signal processing section can be adopted without the need to provide recording section 413 in the apparatus.

If one communication is immediately followed by another, the following processing is performed. First, switching sections 408 and 409 are set in such a way that the outputs of reception antennas 406 and 407 are supplied to reception radio circuits 410 and 411. Received signal processing section 412 carries out such processing that the measured reception characteristics are offset by referencing the calibration tables created by the calibration processing.

With such a configuration and operation, the phase of the measured calibration desired spread spectrum signal does not include phase rotations generated by the power control section. This makes it possible to carry out accurate measurements of the reception characteristics when the received signal power varies, create accurate calibration tables and obtain accurate reception directivity using those calibration tables.

In addition, since the calibration interference spread spectrum modulated signal generator can have the same configuration as that of the calibration desired spread spectrum modulated signal generator, it has an advantage that the transmission section inside the communication apparatus can be diverted as the calibration interference spread spectrum modulated signal generator eliminating the necessity of providing a dedicated calibration signal generator which can generate random noise.

Furthermore, since received signal processing section 412 can suppress noise to a small value by adjusting the type and timing of a spreading code so as to reduce the correlation between the spreading code used by the calibration desired spread spectrum modulated signal generator and the spreading code used by the calibration interference spread spectrum modulated signal generator, it is possible to measure the reception characteristic for the calibration desired spread spectrum modulated signal with high precision.

(Embodiment 4)

In Embodiment 1, calibration desired signal power Pd must be fixed during a calibration. Thus, if characteristic measurement needs to be performed with small combined calibration signal power, it is necessary to set calibration desired signal power Pd to a small value. In this case, when performing characteristic measurements with large combined calibration signal power, the ratio of calibration desired signal power to the calibration interference signal power greatly deteriorates.

Embodiment 4 is intended to compensate this drawback so that changing calibration desired signal power Pd according to the required combination signal power may not affect characteristic measurements.

Figure 6:
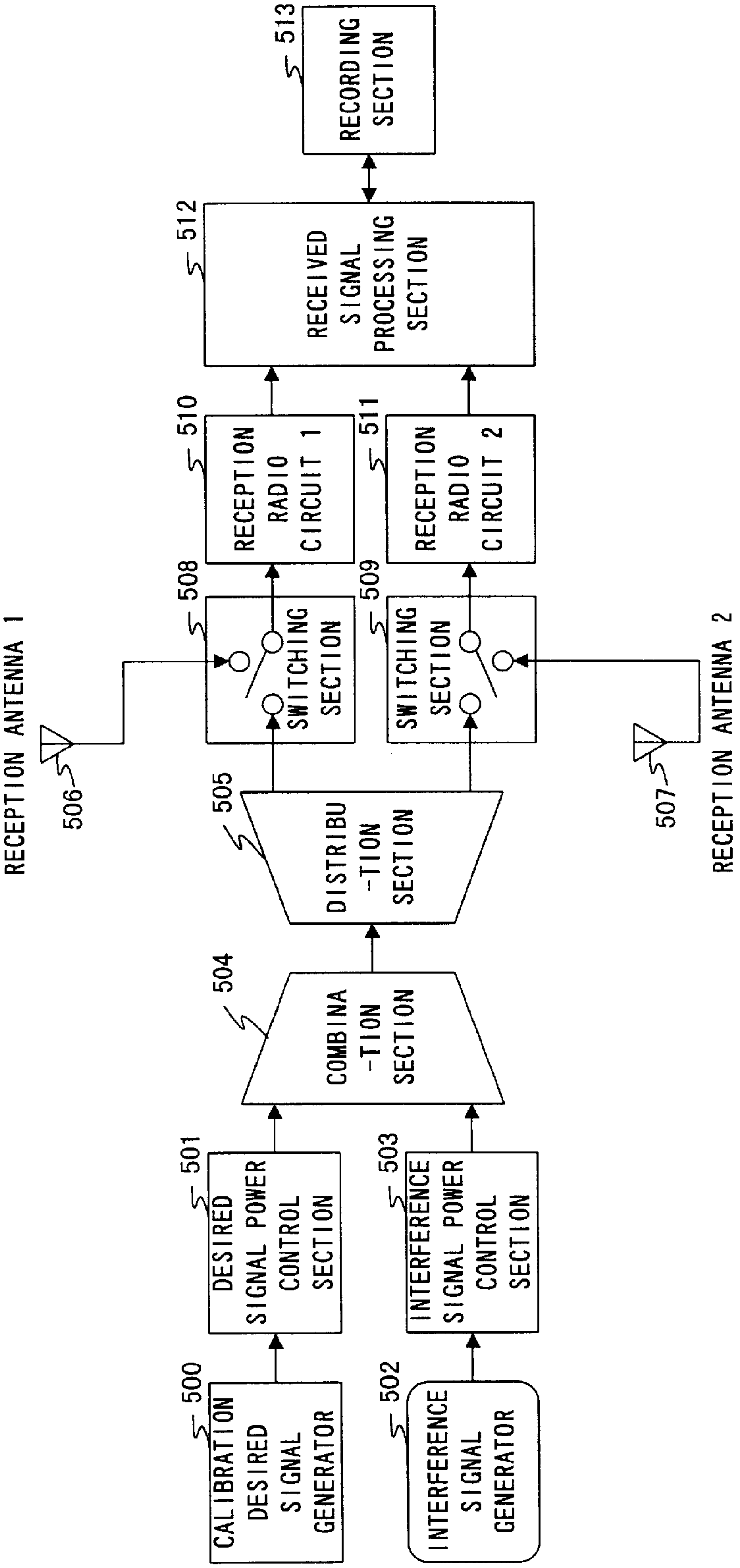
FIG. 6 is a block diagram showing the configuration of an array antenna communication apparatus according to Embodiment 4 of the present invention.

FIG. 6 is a block diagram showing the configuration of an array antenna radio communication apparatus according to Embodiment 4 of the present invention.

The array antenna radio communication apparatus according to the present embodiment comprises calibration desired signal generator 500 and calibration interference signal generator 502. A section that can generate random noise or non-modulated sine waves can be used as calibration interference signal generator 502.

Desired signal power control section 501 adjusts the amplitude of a calibration desired signal from calibration desired signal generator 500. Interference signal power control section 503 adjusts the amplitude of a calibration interference signal from calibration interference signal generator 502. It is possible to use an attenuator and variable gain amplifier as the actual power control section.

Combination section 504 combines the calibration desired signal and calibration interference signal and distribution section 505 distributes the combined signal. As distribution section 505, if it is desired to supply two or more signals simultaneously a distributor may be used, and if it is desired to supply only one signal at a time either a switch or a cable switching section may be used.

Switching sections 508 and 509 receive signals from reception antennas 506 and 507, respectively. For the switching sections, cable switching sections, mechanical switches and electronic switches, etc. may be used. Reception radio circuits 510 and 511 demodulate the signals switched by switch sections 508 and 509. Received signal processing section 512 processes the signals using difference values stored in recording section 513.

Since the present embodiment takes as an example, an array antenna radio communication apparatus with an array antenna reception function using two antennas, there are two reception antennas, two switching sections and two reception radio circuits.

Figure 7:
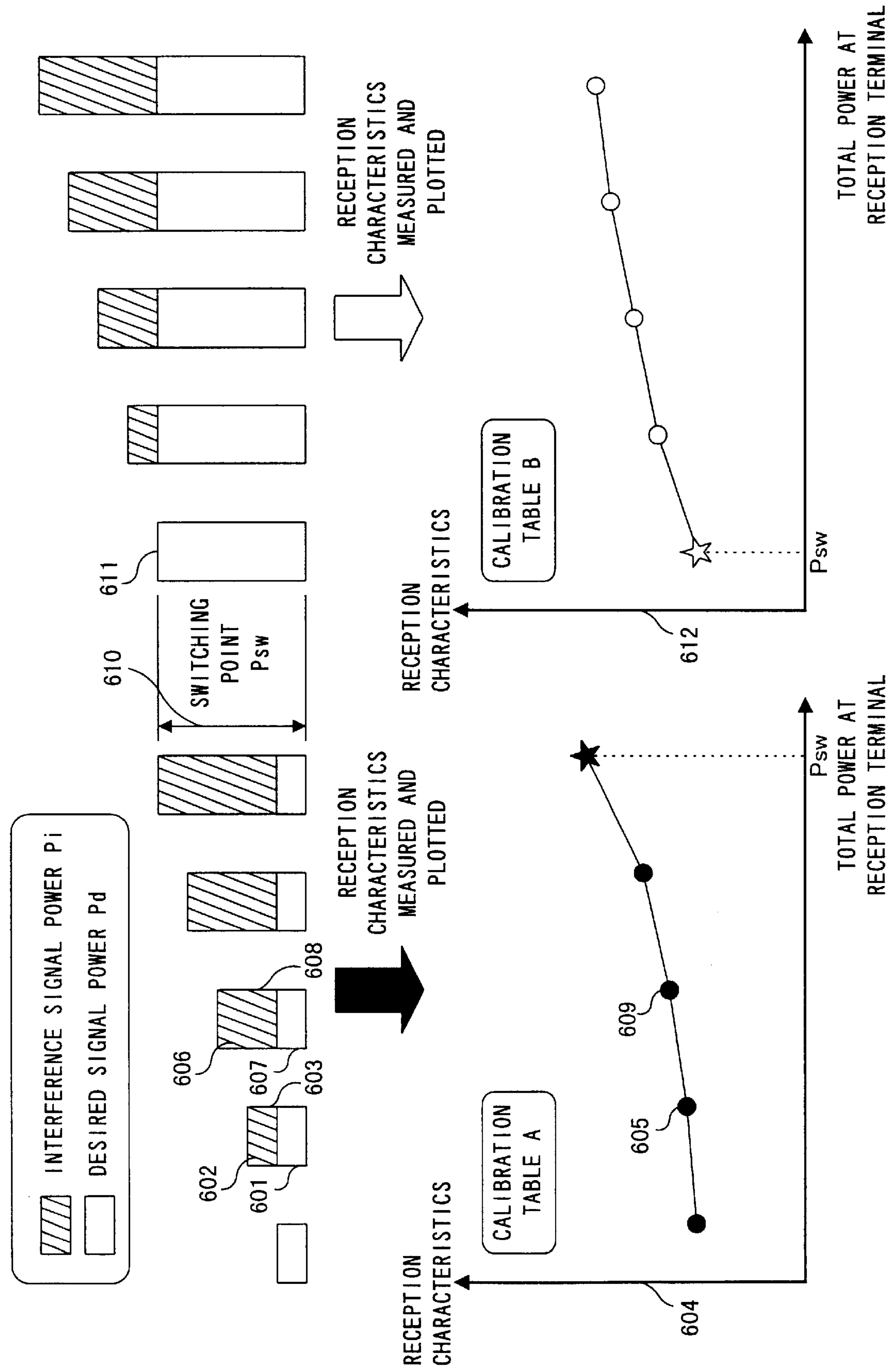
FIG. 7 is a schematic to explain the operation of the received signal processing section of the array antenna radio communication apparatuses according to Embodiments 4 to 6 of the present invention.
Figure 8:
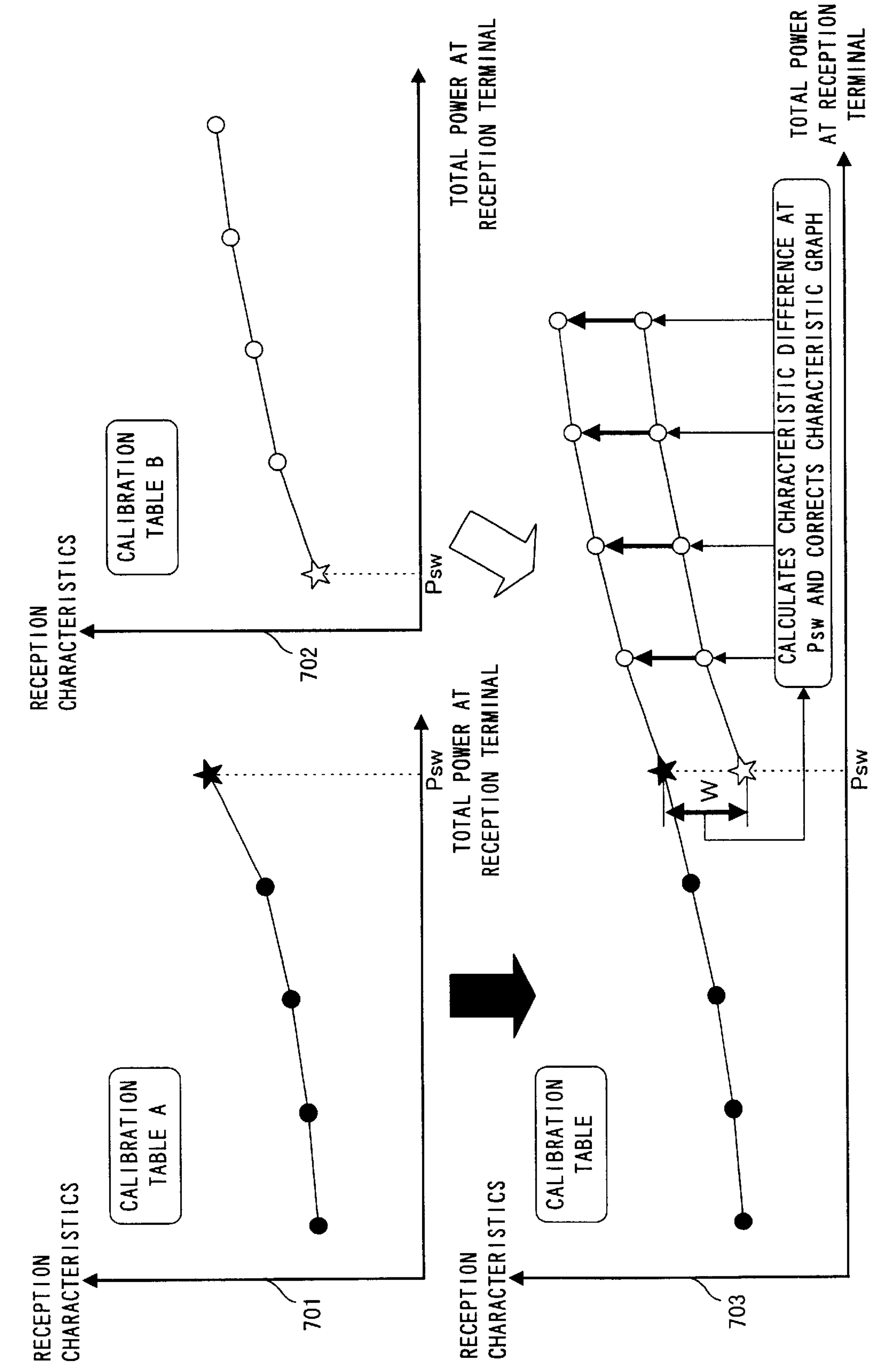
FIG. 8 is a schematic to explain the operation of he received signal processing section of the array antenna radio communication apparatuses according to Embodiments 4 to 6 of the present invention.

The operation of the array antenna radio communication apparatus according to Embodiment 4 of the present invention is explained using FIG. 6 to FIG. 8.

During a calibration, switching sections 508 and 509 are set so that the output of distribution section 505 may be supplied to reception radio circuits 510 and 511. First, reception characteristics corresponding to the power of a combined calibration signal at a certain level are measured.

Calibration desired signal generator 500 generates a calibration desired signal that can be demodulated by received signal processing 512. Power generated Pd is fixed at a certain value using power control section 501. In FIG. 7, the value of Pd is illustrated by white bar graph 601.

Calibration interference signal generator 502 generates calibrations interference signals such as random noise and non-modulated sine waves that can not necessarily be demodulated by received signal processing section 512. The power of calibration interference signals is controlled by power control section 503. Here the signal power at the output of power control section 503 is assumed to be Pi. In FIG. 7, the value of Pi is illustrated by shaded bar graph 602.

A calibration desired signal with signal power Pd and calibration interference signal with signal power Pi are combined by combination section 504 into a combined calibration signal, which in turn is supplied to reception radio circuits 510 and 511 via switching sections 508 and 509. The power of the combined calibration signal at this time is Pd+Pi. In FIG. 7, the value Pd+Pi is represented by sum 603 of white bar graph 601 and shaded bar graph 602.

Received signal processing section 512 obtains a demodulated signal by demodulating the outputs of reception radio circuits 510 and 511. Received signal processing section 512 operates so that only the calibration desired signal component may be demodulated. The calibration interference signal component is superimposed on the demodulated signal as noise.

Then, received signal processing section 512 observes the demodulated signal and obtains the reception characteristics. The reception characteristics include, for example, the phase and amplitude of the demodulated signal. Received signal processing section 512 records the deviation from the expected value in the reception characteristics in calibration table A604 as a characteristic difference to be corrected at the time of communication.

When illustrated in a logical image drawing, this would be equivalent to placing plot 605 in calibration table A604 in which calibration signal power Pi+Pd is plotted on the horizontal axis and the characteristic difference is plotted on the vertical axis. Since measurements of the characteristic difference are performed independently for each reception radio circuit, calibration table A604 is also created independently by the number of reception radio circuits. Calibration table A604 is stored in recording section 513 provided inside or outside the received signal processing section.

This completes a measurement of the reception characteristics for the power of one combined calibration signal.

Then, another measurement of the reception characteristics is carried out for the power of another combined calibration signal. Using power control section 503, calibration interference signal power Pi is changed and set to a value expressed by shaded bar graph 602. At this time, since calibration desired signal power Pd is not changed, Pd is expressed by white bar graph 607 as high as white bar graph 601. At this time, the combined calibration signal power is Pd+Pi. In FIG. 7, value Pd+Pi is illustrated by sum 608 of white bar graph 607 and shaded bar graph 606.

Likewise, received signal processing section 512 records the deviation from the expected value in the reception characteristics in calibration table A604 as a characteristic difference to be corrected at the time of communication. When illustrated in a logical image drawing, this would be equivalent to placing plot 609 in calibration table A604.

Repeating the above processing, the reception characteristic for the required combined calibration signal power with switching point power (Psw) 610 or less is measured and calibration table A604 is recorded. This completes calibration table A604.

After calibration table A604 is completed, the settings of power control section 501 and 503 are changed. Here, combined calibration signal power (Pd+Pi) is set equal to aforementioned switching point power (Psw) 610. For example, the calibration desired signal power (Pd) which was small until then is increased and the calibration desired signal power (Pd) which was large until then is decreased. Then, in the same way as when calibration table A604 was created, only the setting of power control section 503 is changed and by changing only the calibration interference signal power, measurements of the reception characteristics are repeated and calibration table B612 is created in recording section 513.

At this time, combined calibration signal power (Pd+Pi) is not set to the value used when calibration table A604 was created except switching point power (Psw) 610. It is naturally possible to provide a recording section apart from recording section 513 in which calibration table A604 was stored and store calibration table B612. The above processing completes calibration table B612.

Finally, calibration table A604 and calibration table B612 are combined into a combined calibration table. The combination method is explained using FIG. 8 below.

When calibration table A701 and calibration table B702 are superimposed on a same graph, switching point power (Psw) in calibration table A701 and Psw in calibration table B702 are shifted. This shift, that is, the difference of the overlapping plots on the vertical axis value is calculated and stored as W. This W is a characteristic variation that appears by changing the setting of power control section 501 on the calibration desired received signal side, not the characteristics of reception radio circuits 510 and 511 and thus it should be compensated and deleted.

Combination calibration table 703 is completed by carrying out a parallel translation of all plots of combination calibration table 703 by W. The characteristic curve in the corrected combination calibration table becomes a continuous curve without abrupt drops or falls.

As shown above, this calibration method carries out calibrations by increasing the calibration interference signal while keeping the calibration desired signal constant (with power switching). That is, the power of the calibration interference signal is controlled to change the total power when creating a calibration table. Therefore, the difference of the power control section itself is included in the calibration interference signal. On the other hand, since the calibration interference signal is simply handled as noise by received signal processing section 112, received signal processing section 112 can detect only the difference of the reception radio circuits. Therefore, it is possible to create an accurate calibration table which reflects only the difference of the reception radio circuits.

This embodiment showed an example of creating a calibration table by dividing it into two stages A and B, but it is obvious that it is also possible to create a calibration table by dividing it into three stages.

This completes the calibration processing. By the way, if one communication is not immediately followed by another, for example, when only a measurement of the reception radio circuit characteristics is intended, a method of observing the reception characteristics directly from the received signal processing section can be adopted without the need to provide recording section 513 in the apparatus.

If one communication is immediately followed by another, the following processing is performed. First, switching sections 508 and 509 are set in such a way that the outputs of reception antennas 506 and 507 are supplied to reception radio circuits 510 and 511. Received signal processing section 512 carries out such processing that the measured reception characteristics are offset by referencing the calibration tables created by the calibration processing.

In this embodiment, the phase of the measured calibration desired signal does not include phase rotations generated by the power control section even if the calibration desired signal power is changed. Furthermore, when measuring characteristics with large combined calibration signal power, it is possible to prevent the ratio of calibration desired signal power to the calibration interference signal power from drastically deteriorating.

This makes it possible to accurately measure the reception characteristics when received signal power varies, create accurate calibration tables and obtain accurate reception directivity using those calibration tables.

(Embodiment 5)

In Embodiment 2, calibration desired digital modulated signal power Pd must be fixed during a calibration. Thus, if characteristic measurement needs to be performed with small combined calibration digital modulated signal power, it is necessary to set calibration desired digital modulated signal power Pd to a small value. In this case, when performing characteristic measurements with large combined calibration digital modulated signal power, the ratio of calibration desired digital modulated signal power to the calibration interference digital modulated signal power greatly deteriorates.

Embodiment 5 is intended to compensate this drawback so that changing calibration desired digital modulated signal power Pd according to the required combined calibration digital modulated signal power may not affect characteristic measurements.

Figure 9:
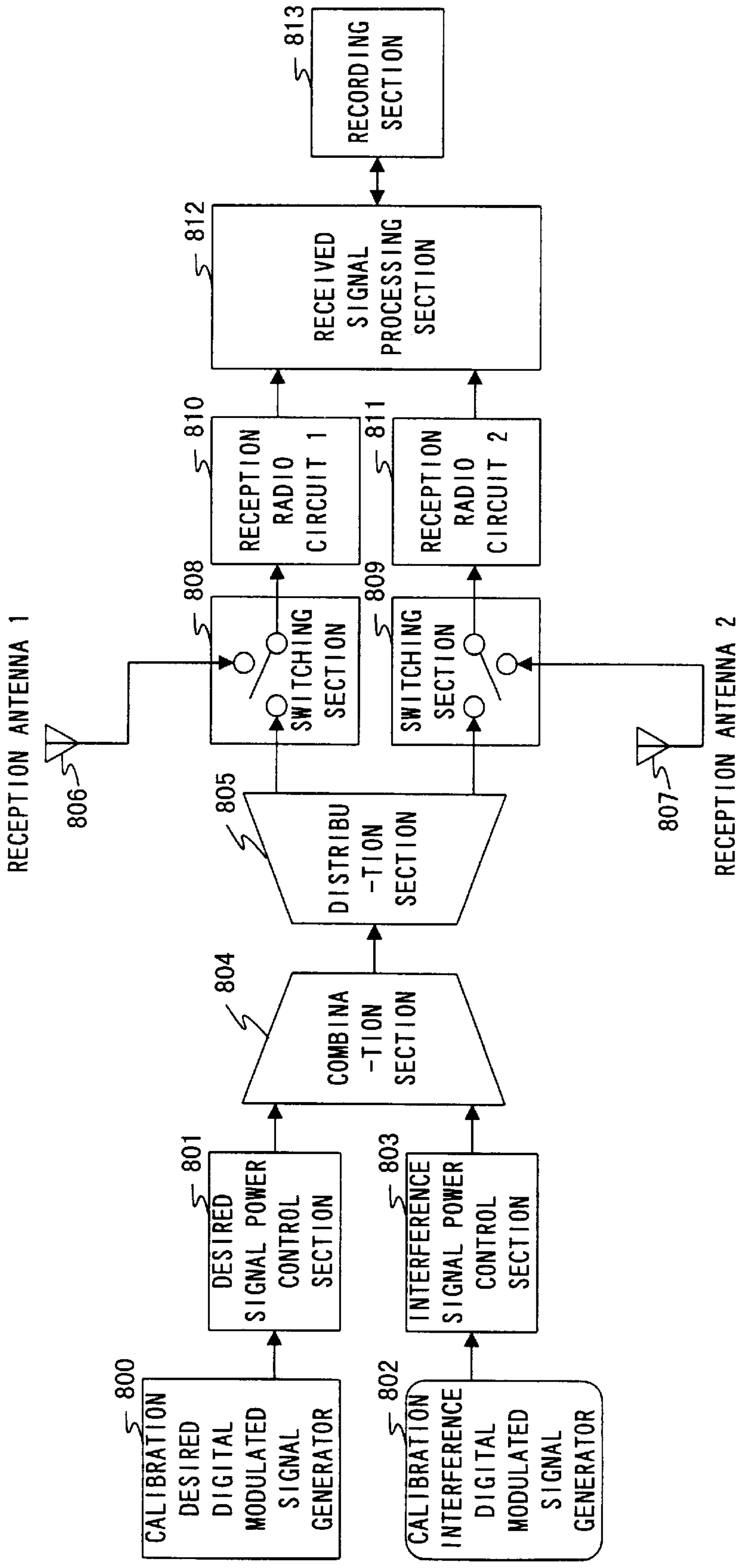
FIG. 9 is a block diagram showing the configuration of an array antenna communication apparatus according to Embodiment 5 of the present invention.

FIG. 9 is a block diagram showing the configuration of an array antenna radio communication apparatus according to Embodiment 5 of the present invention.

The array antenna radio communication apparatus according to the present embodiment comprises calibration desired digital modulated signal generator 800 and calibration interference digital modulated signal generator 802. Calibration desired digital modulated signal generator 800 and calibration interference digital modulated signal generator 802 have the same configuration.

Desired signal power control section 801 adjusts the amplitude of a calibration desired digital modulated signal from calibration desired digital modulated signal generator 800. Interference digital modulated signal power control section 803 adjusts the amplitude of a calibration interference digital modulated signal from calibration interference digital modulated signal generator 802. It is possible to use an attenuator and variable gain amplifier as the actual power control section.

Combination section 804 combines the calibration desired digital modulated signal and calibration interference digital modulated signal and distribution section 805 distributes the combined signal. As distribution section 805, if it is desired to supply two or more signals simultaneously a distributor may be used, and if it is desired to supply only one signal at a time either a switch or a cable switching section may be used.

Switching sections 808 and 809 receive signals from reception antennas 806 and 807, respectively. For switching sections, cable switching sections, mechanical switches and electronic switches, etc. may be used. Reception radio circuits 810 and 811 demodulate the signals switched by switch sections 808 and 809. Received signal processing section 812 processes the signals using difference values stored in recording section 813.

Since the present embodiment takes as an example, an array antenna radio communication apparatus with an array antenna reception function using two antennas, there are two reception antennas, two switching sections and two reception radio circuits.

The operation of the array antenna radio communication apparatus according to Embodiment 5 of the present invention is explained using FIG. 7 to FIG. 9.

During a calibration, switching sections 808 and 809 are set so that the output of distribution section 805 may be supplied to reception radio circuits 810 and 811. First, reception characteristics corresponding to the power of a combined calibration signal at a certain level are measured.

Calibration desired digital modulated signal generator 800 generates a calibration desired digital modulated signal that can be demodulated by received signal processing 812. The totality or part of the modulation digital information of the calibration desired digital modulated signal needs to be known to received signal processing section 812. Power generated Pd is fixed at a certain value using power control section 801. In FIG. 7, the value of Pd is illustrated by white bar graph 601.

Calibration interference digital modulated signal generator 802 has the same configuration as that of calibration desired digital modulated signal generator 800 and generates calibrations interference digital modulated signals whose modulation digital information is different from that of the calibration desired digital modulated signal. The power of calibration interference digital modulated signals is controlled by power control section 803. Here the signal power at the output of power control section 803 is assumed to be Pi. In FIG. 7, the value of Pi is illustrated by shaded bar graph 602.

A calibration desired digital modulated signal with signal power Pd and calibration interference digital modulated signal with signal power Pi are combined by combination section 804 into a combined calibration signal, which in turn is supplied to reception radio circuits 810 and 811 via switching sections 808 and 809. The power of the combined calibration signal at this time is Pd+Pi. In FIG. 7, the value Pd+Pi is represented by sum 603 of white bar graph 601 and shaded bar graph 602.

Received signal processing section 812 obtains a demodulated signal by demodulating the outputs of reception radio circuits 810 and 811. Here, it is required that only the component of the calibration desired digital modulated signal be demodulated, but it has the calibration interference digital modulated signal component superimposed on it and it is usually impossible to demodulate it. Therefore, the demodulated signal of the combined calibration digital modulated signal is multiplied by a known modulation digital information series of the calibration interference digital modulated signal and the result is integrated. This makes the calibration interference digital modulated signal component averaged and suppressed, making it possible to extract only the calibration desired digital modulated signal component.

Then, received signal processing section 812 observes the demodulated signal obtained in this way and obtains the reception characteristics. The reception characteristics include, for example, the phase and amplitude of the demodulated signal. Received signal processing section 812 records the deviation from the expected value in the reception characteristics in calibration table A604 as a characteristic difference to be corrected at the time of communication.

When illustrated in a logical image drawing, this would be equivalent to placing plot 605 in calibration table A604 in which calibration digital modulated signal power Pi+Pd is plotted on the horizontal axis and the characteristic difference is plotted on the vertical axis. Since measurements of the characteristic difference are performed independently for each reception radio circuit, calibration table A604 is also created independently by the number of reception radio circuits. Calibration table A604 is stored in recording section 813 provided inside or outside the received signal processing section.

This completes a measurement of the reception characteristics for the power of one combined calibration digital modulated signal.

Then, another measurement of the reception characteristics is carried out for the power of another combined calibration digital modulated signal. Using the power control section, calibration interference digital modulated signal power Pi is changed and set to a value expressed by shaded graph 602. At this time, since calibration desired digital modulated signal power Pd is not changed, Pd is expressed by white bar graph 607 as high as white bar graph 601. The combined calibration signal power at this time is Pd+Pi. In FIG. 7, value Pd+Pi is illustrated by sum 608 of white bar graph 607 and shaded bar graph 606.

Likewise, received signal processing section 812 records the deviation from the expected value in the reception characteristics in calibration table A604 as a characteristic difference to be corrected at the time of communication. When illustrated in a logical image drawing, this would be equivalent to placing plot 609 in calibration table A604.

Repeating the above processing, the reception characteristic for the required combined calibration digital modulated signal power with switching point power (Psw) 610 or less is measured and calibration table A604 is recorded. This completes calibration table A604.

After calibration table A604 is completed, the settings of power control section 801 and 803 are changed. Here, combined calibration digital modulated signal power (Pd+Pi) is set equal to aforementioned switching point power (Psw) 610. For example, the calibration desired digital modulated signal power (Pd) which was small until then is increased and the calibration digital modulated desired signal power (Pd) which was large until then is decreased. Then, in the same way as when calibration table A604 was created, only the setting of power control section 803 is changed and by changing only the calibration interference digital modulated signal power, measurements of the reception characteristics are repeated and calibration table B612 is created in recording section 813.

At this time, combined calibration digital modulated signal power (Pd+Pi) is not set to the value used when calibration table A604 was created except switching point power (Psw) 610. It is naturally possible to provide a recording section apart from recording section 813 in which calibration table A604 was stored and store calibration table B612. The above processing completes calibration table B612.

Finally, calibration table A604 and calibration table B612 are combined into combined calibration table 614. The combination method is the same as that in Embodiment 4, and thus its explanation is omitted.

As shown above, this calibration method carries out calibrations by increasing the calibration interference digital modulated signal while keeping the calibration desired digital modulated signal constant (with power switching). That is, the power of the calibration interference digital modulated signal is controlled to change the total power when creating a calibration table. Therefore, the difference of the power control section itself is only included in the calibration interference digital modulated signal. On the other hand, the calibration interference digital modulated signal is averaged and suppressed by received signal processing section 812 by multiplying the modulated signal by a modulated digital information series and integrating it. This allows received signal processing section 812 to extract only the calibration desired digital modulated signal component and detect only the difference of the reception radio circuits. Therefore, it is possible to create an accurate calibration table which reflects only the difference of the reception radio circuits.

This embodiment showed an example of creating a calibration table by dividing it into two stages A and B, but it is obvious that it is also possible to create a calibration table by dividing it into three stages.

This completes the calibration processing. By the way, if one communication is not immediately followed by another, for example, when only a measurement of the reception radio circuit characteristics is intended, a method of observing the reception characteristics directly from the received signal processing section can be adopted without the need to provide recording section 813 in the apparatus.

If one communication is immediately followed by another, the following processing is performed. First, switching sections 808 and 809 are set in such a way that the outputs of reception antennas 806 and 807 are supplied to reception radio circuits 810 and 811. Received signal processing section 812 carries out such processing that the measured reception characteristics are offset by referencing the calibration tables created by the calibration processing.

In this embodiment, the phase of the measured calibration desired digital modulated signal does not include phase rotations generated by the power control section even if the calibration desired digital modulated signal power is changed. Furthermore, when measuring characteristics with large combined calibration signal power, it is possible to prevent the ratio of calibration desired digital modulated signal power to the calibration interference digital modulated signal power from drastically deteriorating.

This makes it possible to accurately measure the reception characteristics when received signal power varies, create accurate calibration tables and obtain accurate reception directivity using those calibration tables.

In addition, since the calibration interference digital modulated signal generator can have the same configuration as that of the calibration desired digital modulated signal generator, it has an advantage that the transmission section inside the communication apparatus can be diverted as the calibration interference digital modulated signal generator, eliminating the necessity of providing a dedicated calibration signal generator which can generate random noise.

(Embodiment 6)

In Embodiment 3, calibration desired spread spectrum modulated signal power Pd must be fixed during a calibration. Thus, if characteristic measurement needs to be performed with small combined calibration spread spectrum modulated signal power, it is necessary to set calibration desired spread spectrum modulated signal power Pd to a small value. In this case, when performing characteristic measurements with large combined calibration spread spectrum modulated signal power, the ratio of calibration desired spread spectrum modulated signal power to the calibration interference spread spectrum modulated signal power greatly deteriorates.

Embodiment 6 is intended to compensate this drawback so that changing calibration desired spread spectrum modulated signal power Pd according to the required combined spread spectrum modulated signal power may not affect characteristic measurements.

Figure 10:
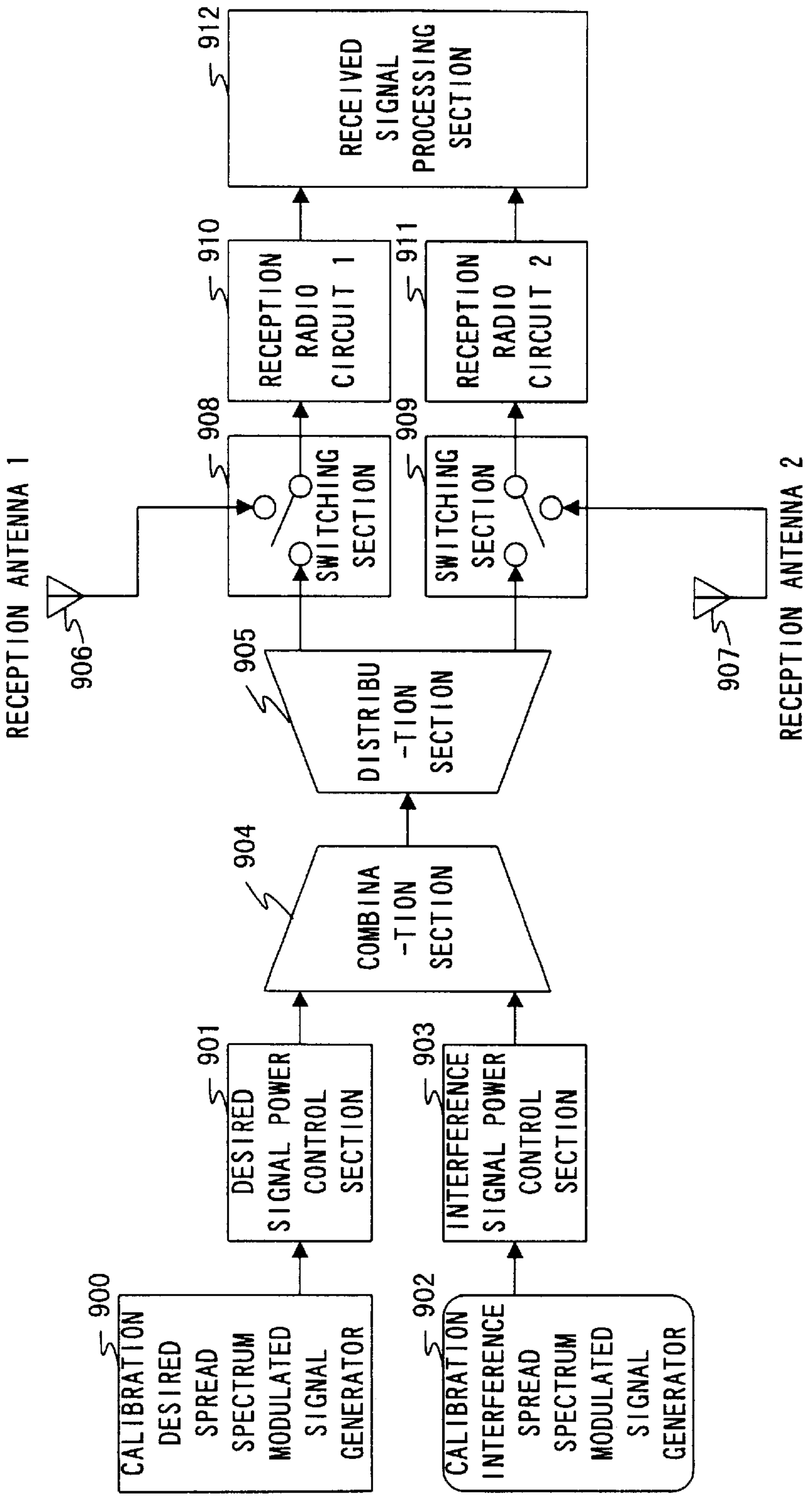
FIG. 10 is a block diagram showing the configuration of an array antenna communication apparatus according to Embodiment 6 of the present invention.

FIG. 10 is a block diagram showing the configuration of an array antenna radio communication apparatus according to Embodiment 6 of the present invention.

The array antenna radio communication apparatus according to the present embodiment comprises calibration desired spread spectrum modulated signal generator 900 and calibration interference spread spectrum modulated signal generator 902. Calibration desired spread spectrum modulated signal generator 900 and calibration interference spread spectrum modulated signal generator 902 have virtually the same configuration and have mutually different spreading codes.

Desired signal power control section 901 adjusts the amplitude of a calibration desired spread spectrum modulated signal from calibration desired spread spectrum modulated signal generator 900. Interference spread spectrum modulated signal power control section 903 adjusts the amplitude of a calibration interference spread spectrum modulated signal from calibration interference spread spectrum modulated signal generator 902. It is possible to use an attenuator and variable gain amplifier as the actual power control section.

Combination section 904 combines the calibration desired spread spectrum modulated signal and calibration interference spread spectrum modulated signal and distribution section 905 distributes the combined signal. As distribution section 905, if it is desired to supply two or more signals simultaneously a distributor may be used, and if it is desired to supply only one signal at a time either a switch or a cable switching section may be used.

Switching sections 908 and 909 receive signals from reception antennas 906 and 907, respectively. For switching sections, cable switching sections, mechanical switches and electronic switches, etc. may be used. Reception radio circuits 910 and 911 demodulate the signals switched by switch sections 908 and 909. Received signal processing section 912 processes the signals using difference values stored in recording section 913.

Since the present embodiment takes as an example, an array antenna radio communication apparatus with an array antenna reception function using two antennas, there are two reception antennas, two switching sections and two reception radio circuits.

The operation of the array antenna radio communication apparatus according to Embodiment 6 of the present invention is explained using FIG. 7, FIG. 8 and FIG. 10.

During a calibration, switching sections 908 and 909 are set so that the output of distribution section 905 may be supplied to reception radio circuits 910 and 911. First, reception characteristics corresponding to the power of a combined calibration spread spectrum modulated signal at a certain level are measured.

Calibration desired spread spectrum modulated signal generator 900 generates a calibration desired spread spectrum modulated signal that can be demodulated by received signal processing 912. The spreading code of the calibration desired spread spectrum modulated signal needs to be known to received signal processing section 912. Power generated Pd is fixed at a certain value using power control section 901. In FIG. 7, the value of Pd is illustrated by white bar graph 601.

Calibration interference spread spectrum modulated signal generator 902 has the same configuration as that of calibration desired spread spectrum modulated signal generator 900 and generates calibrations interference spread spectrum modulated signals whose spreading code is different from that of the calibrations desired spread spectrum modulated signal. The power of calibration interference spread spectrum modulated signals is controlled by power control section 903. Here the signal power at the output of power control section 903 is assumed to be Pi. In FIG. 7, the value of Pi is illustrated by shaded bar graph 602.

A calibration desired spread spectrum modulated signal with signal power Pd and calibration interference spread spectrum modulated signal with signal power Pi are combined by combination section 904 into a combined calibration spread spectrum modulated signal, which in turn is supplied to reception radio circuits 910 and 911 via switching sections 908 and 909. The power of the combined calibration signal at this time is Pd+Pi. In FIG. 7, the value Pd+Pi is represented by sum 603 of white bar graph 601 and shaded bar graph 602.

Received signal processing section 912 obtains a demodulated signal by demodulating the outputs of reception radio circuits 910 and 911. Here, it is required that only the component of the calibration desired spread spectrum modulated signal be demodulated, but since the spreading code of the calibration desired spread spectrum modulated signal is known to received signal processing section 912, it is possible to extract the calibration desired spread spectrum modulated signal by finding correlation between this spreading code and combined calibration spread spectrum modulated signal.

Then, received signal processing section 912 observes the demodulated signal and obtains the reception characteristics. The reception characteristics include, for example, the phase and amplitude of the demodulated signal. Received signal processing section 912 records the deviation from the expected value in the reception characteristics in calibration table A604 as a characteristic difference to be corrected at the time of communication. When illustrated in a logical image drawing, this would be equivalent to placing plot 605 in calibration table A604 in which calibration spread spectrum modulated signal power Pi+Pd is plotted on the horizontal axis and the characteristic difference is plotted on the vertical axis. Since measurements of the characteristic difference are performed independently for each reception radio circuit, calibration table A604 is also created independently by the number of reception radio circuits. Calibration table A604 is stored in recording section 913 provided inside or outside the received signal processing section.

This completes a measurement of the reception characteristics for the power of one combined calibration spread spectrum modulated signal.

Then, another measurement of the reception characteristics is carried out for the power of another combined calibration spread spectrum modulated signal. Using the power control section, calibration interference spread spectrum modulated signal power Pi is changed and set to a value expressed by shaded bar graph 602. At this time, since calibration desired spread spectrum modulated signal power Pd is not changed, Pd is expressed by white bar graph 607 as high as white bar graph 601. The combined calibration signal power at this time is Pd+Pi. In FIG. 7, value Pd+Pi is illustrated by sum 608 of white bar graph 607 and shaded bar graph 606.

Likewise, received signal processing section 912 records the deviation from the expected value in the reception characteristics in calibration table A604 as a characteristic difference to be corrected at the time of communication. When illustrated in a logical image drawing, this would be equivalent to placing plot 609 in calibration table A604.

Repeating the above processing, the reception characteristic for the required combined calibration spread spectrum modulated signal power with switching point power (Psw) 610 or less is measured and calibration table A604 is recorded. This completes calibration table A604.

After calibration table A604 is completed, the settings of power control section 901 and 903 are changed. Here, combined calibration spread spectrum modulated signal power (Pd+Pi) is set equal to aforementioned switching point power (Psw) 610. For example, the calibration desired spread spectrum modulated signal power (Pd) which was small until then is increased and the calibration spread spectrum modulated desired signal power (Pd) which was large until then is decreased. Then, in the same way as when calibration table A604 was created, only the setting of power control section 903 is changed and by changing only the calibration interference spread spectrum modulated signal power, measurements of the reception characteristics are repeated and calibration table B612 is created in recording section 913.

At this time, combined calibration spread spectrum modulated signal power (Pd+Pi) is not set to the value used when calibration table A604 was created except switching point power (Psw) 610. It is naturally possible to provide a recording section apart from recording section 913 in which calibration table A604 was stored and store calibration table B612. The above processing completes calibration table B612.

Finally, calibration table A604 and calibration table B612 are combined into combined calibration table 614. The combination method is the same as that in Embodiment 4, and thus its explanation is omitted.

As shown above, this calibration method carries out calibrations by increasing the calibration interference spread spectrum modulated signal while keeping the calibration desired spread spectrum modulated signal constant (with power switching). That is, the power of the calibration interference spread spectrum modulated signal is controlled to change the total power when creating a calibration table. Therefore, the difference of the power control section itself is only included in the calibration interference spread spectrum modulated signal. On the other hand, received signal processing section 912 can extract only the calibration desired digital modulated signal component by finding correlation between the spreading code and the combined calibration spread spectrum modulated signal, making it possible to detect only the difference of the reception radio circuits. Thus, it is possible to create an accurate calibration table which reflects the difference of only the reception radio circuits.

This embodiment showed an example of creating a calibration table by dividing it into two stages A and B, but it is obvious that it is also possible to create a calibration table by dividing it into three stages.

This completes the calibration processing. By the way, if one communication is not immediately followed by another, for example, when only a measurement of the reception radio circuit characteristics is intended, a method of observing the reception characteristics directly from the received signal processing section can be adopted without the need to provide recording section 913 in the apparatus.

If one communication is immediately followed by another, the following processing is performed. First, switching sections 908 and 909 are set in such a way that the outputs of reception antennas 906 and 907 are supplied to reception radio circuits 910 and 911. Received signal processing section 912 carries out such processing that the measured reception characteristics are offset by referencing the calibration tables created by the calibration processing.

In this embodiment, the phase of the measured calibration desired spread spectrum modulated signal does not include phase rotations generated by the power control section even if the calibration desired spread spectrum modulated signal power is changed. Furthermore, when measuring characteristics with large combined calibration spread spectrum modulated signal power, it is possible to prevent the ratio of calibration desired spread spectrum modulated signal power to the calibration interference spread spectrum modulated signal power from drastically deteriorating.

This makes it possible to accurately measure the reception characteristics when received signal power varies, create accurate calibration tables and obtain accurate reception directivity using those calibration tables.

Furthermore, since received signal processing section 912 can suppress noise to a small value by adjusting the type and timing of a spreading code so as to reduce the correlation between the spreading code used by the calibration desired spread spectrum modulated signal generator and the spreading code used by the calibration interference spread spectrum modulated signal generator, it is possible to measure the reception characteristic for the calibration desired spread spectrum modulated signal with high precision.

The array antenna radio communication apparatus of the present invention can be used effectively for mobile station apparatuses and base station apparatuses in radio communication systems.

As explained above, the array antenna radio communication apparatus of the present invention is capable of accurately measuring reception characteristics when the reception power varies drastically, making it possible to create accurate calibration tables. Therefore, it is possible to obtain accurate reception directivity using such calibration tables.

The present invention is not limited to the above described embodiments, and various variations and modifications may be possible without departing from the scope of the present invention.

This application is based on the Japanese Patent Application No.HEI 10-119716 filed on Apr. 28, 1998, entire content of which is expressly incorporated by reference herein.

What is claimed is:

1. An array antenna radio communication apparatus, comprising:

received signal processing means for processing signals received via antennas and calibration signals including a desired signal and interference signal;

power control means for controlling the power of only the interference signal of the calibration signals; and reception characteristic measuring means for measuring reception characteristics of only said desired signal.

2. The array antenna radio communication apparatus according to claim 1, wherein received signal processing means processes interference signals as noise.

3. The array antenna radio communication apparatus according to claim 1, wherein the desired signal includes information known to the received signal processing means, and the received signal processing means can find correlation of said information with a demodulated signal.

4. The array antenna radio communication apparatus according to claim 1, wherein the desired signal includes a spread spectrum signal which has been subjected to spreading processing with a spreading code known to the received signal processing means and the received signal processing means can find correlation of said spread spectrum signal using said spreading code.

5. The array antenna radio communication apparatus according to claim 1, further comprising recording means for recording calibration tables obtained by reception measurements.

6. The array antenna radio communication apparatus according to claim 5, wherein the received signal processing means comprises reception directivity pattern creation means for obtaining reception directivity by referencing calibration tables.

7. An array antenna radio communication apparatus, comprising:

received signal processing means for processing signals received via antennas and calibration signals including a desired signal and interference signal;

first power control means for controlling the power of only the desired signal of the calibration signals; and second power control means for controlling the power of only the interference signal of the calibration signals; and reception characteristic measuring means for measuring reception characteristics of only said desired signal.

8. A base station apparatus equipped with an array antenna radio communication apparatus, wherein said array antenna radio communication apparatus comprises received signal processing means for processing signals received via antennas and calibration signals including a desired signal and interference signal, power control means for controlling the power of only the interference signal of the calibration signals, and reception characteristic measuring means for measuring reception characteristics of only said desired signal.

9. A mobile station apparatus, which carries out radio communications with the base station apparatus according to claim 8.

10. A calibration method, comprising the steps of:

controlling the power of only an interference signal of calibration signals including a desired signal and interference signal;

measuring reception characteristics of calibration signals by fixing the power of said desired signal and changing the power of said interference signal; and creating calibration tables for calibration from the measured reception characteristics.

11. The calibration method according to claim 10, which processes interference signals as noise in the reception characteristic measuring step.

12. The calibration method according to claim 10, which finds correlation of known information included in a desired signal with the modulated signal in the reception characteristic measuring step.

13. The calibration method according to claim 10, which can find correlation of a spread spectrum signal included in the desired signal using a spreading code in the reception characteristic measuring step.

14. The calibration method according to claim 10, further comprising the step of creating reception directivity patterns to find reception directivity by referencing calibration tables.

15. A calibration method, comprising:

a first power control step for controlling only the power of a desired signal of calibration signals containing a desired signal and interference signal;

a second power control step for controlling only the power of an interference signal of calibration signals;

a reception characteristic measuring step for measuring reception characteristics by fixing the power of said desired signal and changing the power of said interference signal; and a calibration table creating step for creating at least two calibration tables for calibrations from the measured reception characteristics.

16. The calibration method according to claim 15, wherein the calibration table creation step includes a step of combining at least two calibration tables into a combined calibration table.

* * * * *